United States Patent
Grimsrud et al.

(10) Patent No.: US 7,330,939 B2
(45) Date of Patent: *Feb. 12, 2008

(54) DETERMINING AN AMOUNT OF DATA READ FROM A STORAGE MEDIUM

(75) Inventors: Knut S. Grimsrud, Forest Grove, OR (US); Amber D. Huffman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 322 days.

This patent is subject to a terminal disclaimer.

(21) Appl. No.: 11/039,277

(22) Filed: Jan. 20, 2005

(65) Prior Publication Data

US 2005/0125608 A1 Jun. 9, 2005

(51) Int. Cl.
  *G06F 12/00* (2006.01)
(52) U.S. Cl. .................. 711/137; 711/154; 711/146; 711/150
(58) Field of Classification Search ............ 711/111, 711/113, 137, 213
  See application file for complete search history.

(56) References Cited

U.S. PATENT DOCUMENTS

| | | |
|---|---|---|
| 5,146,582 A | 9/1992 | Begun |
| 5,367,656 A | 11/1994 | Ryan |
| 5,473,761 A | 12/1995 | Parks et al. |
| 5,483,641 A | 1/1996 | Jones et al. |
| 5,588,128 A | 12/1996 | Hicok et al. |
| 5,600,817 A | 2/1997 | Macon, Jr. et al. |
| 5,619,723 A | 4/1997 | Jones et al. |
| 5,623,308 A | 4/1997 | Civanlar et al. |
| 5,623,608 A | 4/1997 | Ng |
| 5,649,153 A | 7/1997 | McNutt et al. |
| 5,652,858 A | 7/1997 | Okada et al. |
| 5,708,849 A | 1/1998 | Coke et al. |
| 5,721,865 A | 2/1998 | Shintaini et al. |
| 5,802,593 A | 9/1998 | Grimsrud |
| 5,809,560 A | 9/1998 | Schneider |
| 5,822,568 A | 10/1998 | Swanstrom |
| 5,835,783 A | 11/1998 | Grimsrud |
| 5,845,297 A | 12/1998 | Grimsrud et al. |
| 5,881,303 A | 3/1999 | Hagersten et al. |
| 5,953,487 A | 9/1999 | Engle et al. |

(Continued)

FOREIGN PATENT DOCUMENTS

CN         1029047 C    4/1995

(Continued)

OTHER PUBLICATIONS

Soloviev, "Prefetching in Segmented Disk Cache for Multi-Disk Systems," pp. 69-82, ACM, 1996.

(Continued)

*Primary Examiner*—Brian R. Peugh
(74) *Attorney, Agent, or Firm*—Fish & Richardson P.C.

(57) ABSTRACT

Data is read in response to a request for a predetermined amount of data. The amount of data that has been read is determined prior to completing reading the predetermined amount of data. The predetermined amount of data may include prefetch data and demand data, where demand data is data for a computer program and prefetch data is data adjacent to the demand data.

20 Claims, 5 Drawing Sheets

U.S. PATENT DOCUMENTS

| | | |
|---|---|---|
| 6,006,307 A | 12/1999 | Cherukari |
| 6,041,159 A | 3/2000 | Platte |
| 6,085,287 A | 7/2000 | O'Neil et al. |
| 6,195,726 B1 | 2/2001 | Hogan |
| 6,212,603 B1 | 4/2001 | McInerney et al. |
| 6,298,424 B1 | 10/2001 | LewChuck et al. |
| 6,317,810 B1 | 11/2001 | Lopez-Aguado et al. |
| 6,317,811 B1 | 11/2001 | Deshpande et al. |
| 6,449,111 B1 | 9/2002 | Kool et al. |
| 6,449,698 B1 | 9/2002 | Deshpande et al. |
| 6,862,657 B1 * | 3/2005 | Grimsrud et al. ........... 711/112 |
| 6,934,807 B1 * | 8/2005 | Grimsrud et al. ........... 711/137 |

FOREIGN PATENT DOCUMENTS

| | | |
|---|---|---|
| CN | 1112700 C | 12/1998 |
| WO | WO 97/03442 | 1/1997 |
| WO | WO 99/34356 | 8/1999 |

OTHER PUBLICATIONS

Tomkins, et al. "Informed Multi-Process Prefetching and Caching," pp. 100-114, ACM 1997.

Office Action in Chinese Application No. 00817540.3, dated Jan. 16, 2004.

Office Action in Chinese Application No. 00817540.3, dated Dec. 17, 2004.

Kimbrel et al., "Near Optimal Parallel Prefetching and Caching," Proc. 37th Ann. Symposium on Foundations of Computer Science (Oct. 14-16, 1996) 22 pgs.

Chinese Office Action dated Mar. 11, 2004 (Patent No. 6/934,807).

* cited by examiner

DETERMINING AN AMOUNT OF DATA READ FROM A STORAGE MEDIUM

BACKGROUND

This invention relates to determining an amount of data that has been read from a storage medium while a data transfer is in progress.

When reading data from a storage medium, such as a hard disk, a device driver reads the requested data, called "demand data", optionally along with speculative data from other locations on the hard disk. The data from the other locations is called "prefetch data" and corresponds to addresses on the hard disk that are likely to be read next by the device driver (typically contiguous/sequential data).

DESCRIPTION OF THE DRAWINGS

Like reference symbols in the various drawings indicate like elements.

DETAILED DESCRIPTION

Figure 1:
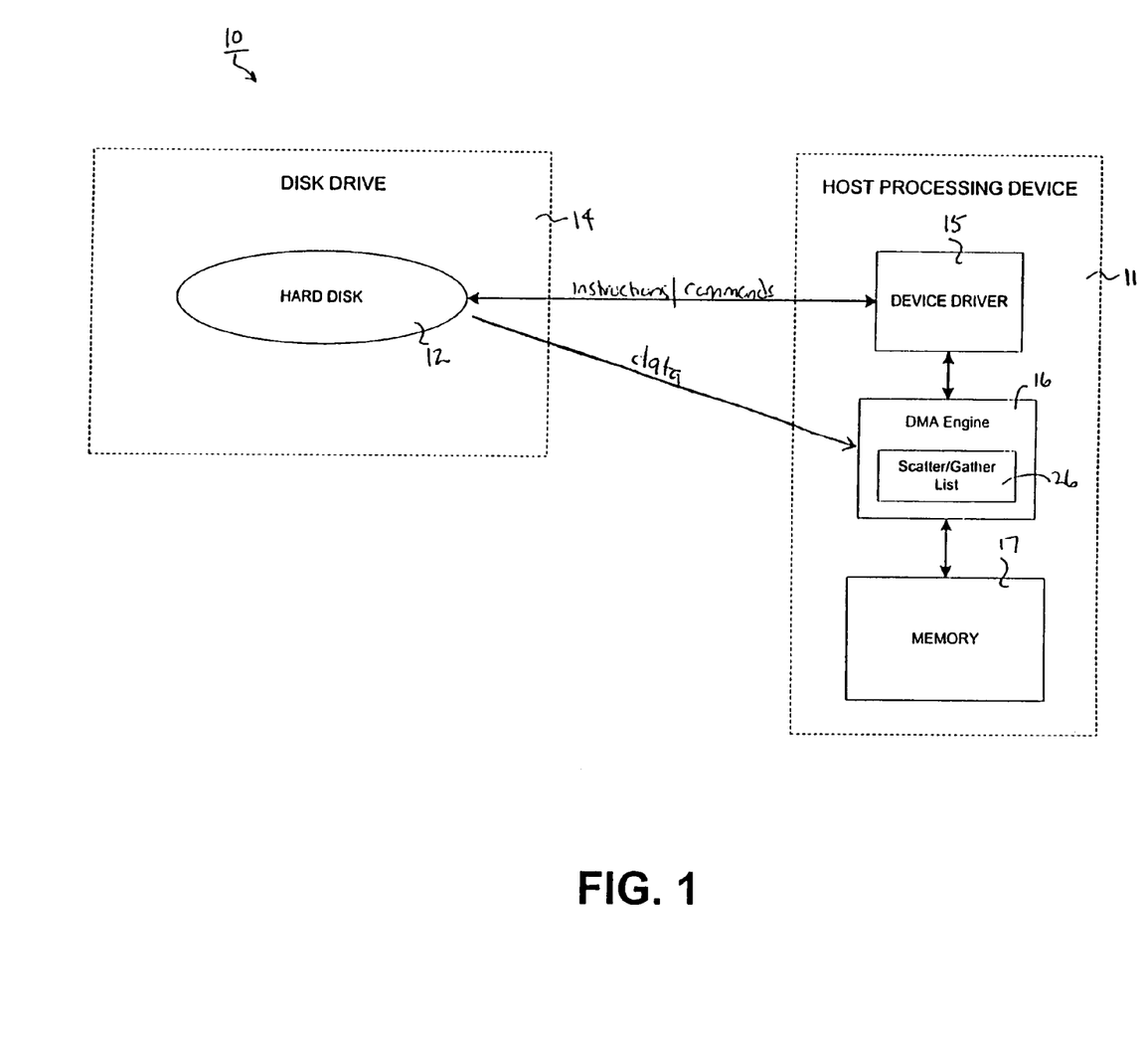
FIG. 1 is a block diagram of a disk drive and a host processing device.

Referring to FIG. 1, block diagram 10 shows a host processing device 11 reading data from a hard disk 12 of a disk drive 14. Disk drive 14 may reside within host processing device 11 or it may be an external drive.

Software (device driver) 15 executing in host processing device 11 receives requests from applications or other computer program(s) (not shown) executing on host processing device 11. These requests instruct device driver 15 to read data from locations on hard disk 12 of disk drive 14. Data is transferred from these locations back to a Direct Memory Access ("DMA") engine 16 also on host processing device 11. DMA engine 16 consults a table, such as scatter/gather list 26, to determine where in memory 17 to store the received data. Scatter/gather list 26 includes lists of addresses in memory 17 into which data from hard disk 12 is to be stored.

Figure 2:
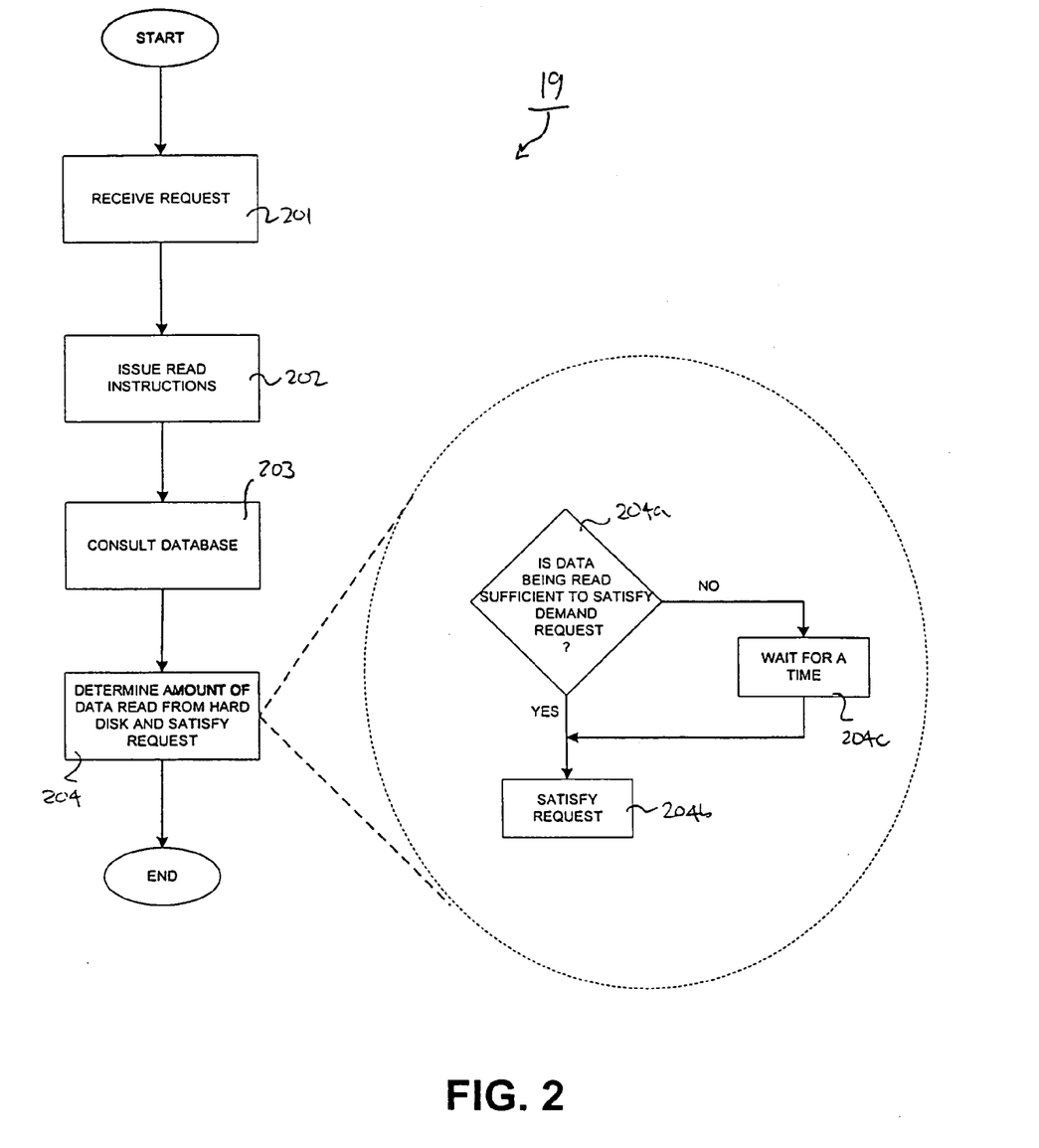
FIG. 2 is a flow diagram showing a process for reading data from the disk drive.

In FIG. 2, a process 19 is shown for reading data from hard disk 12. Device driver 15 receives (201) a request from software (a computer program) on host processing device 11. The request identifies an amount of demand data (the "demand request") at addresses of hard disk 12, and instructs device driver 15 to read the demand data from hard disk 12. Device driver determines the location and amount of prefetch data to be read from hard disk 12 based on the location and/or amount of demand data and adds this information (the "prefetch request") to the original request.

Figure 3:
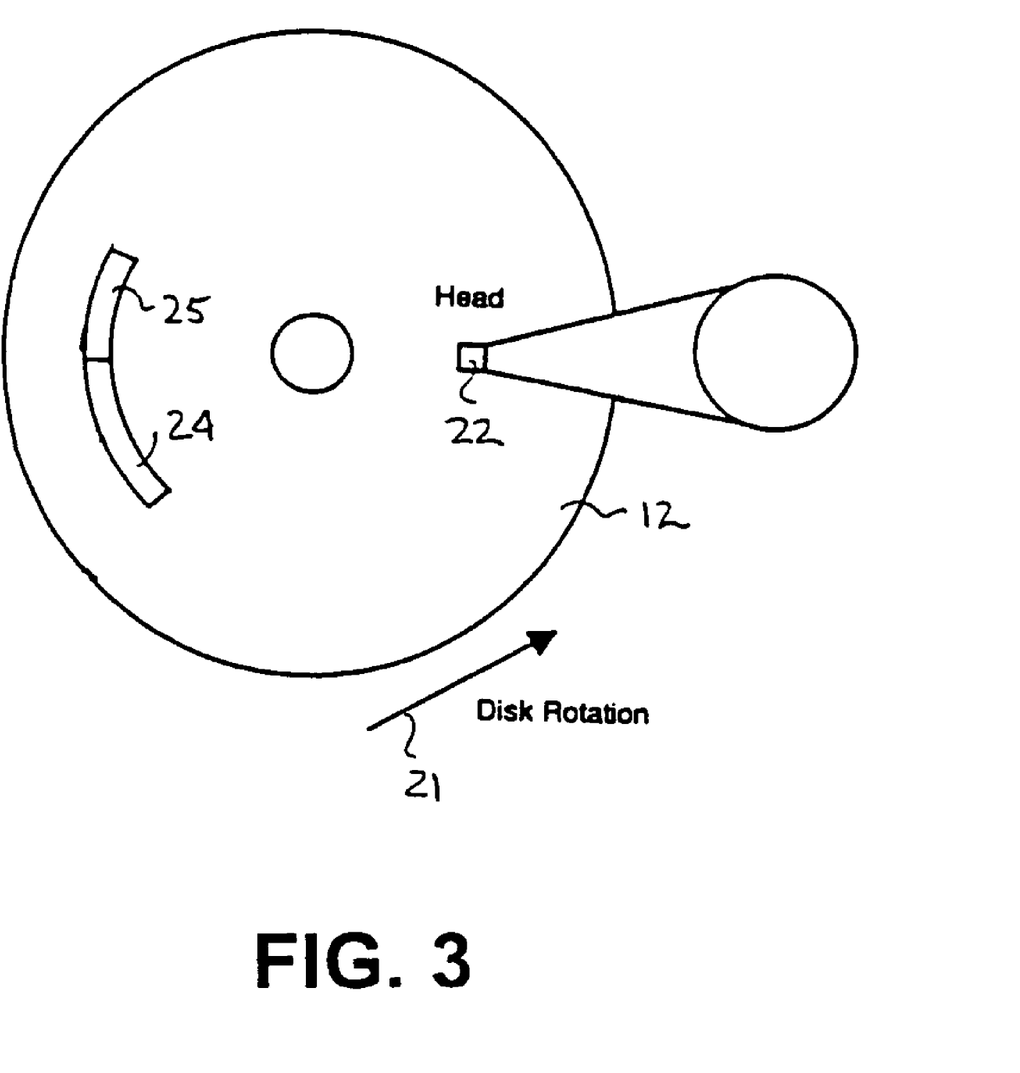
FIG. 3 is a top view of a hard disk and a transducer head in the disk drive.

Demand and prefetch data are typically, but not necessarily, contiguous data blocks. The demand data typically precedes the prefetch data (i.e., the prefetch data is retrieved after the demand data) in a direction of movement of hard disk 12. For example, as shown in FIG. 3, hard disk 12 rotates in a direction of arrow 21 during reading. A transducer head 22 on disk drive 14 reads data from tracks on hard disk 12 during rotation. Since the transducer head encounters demand data 24 before prefetch data 25 (as a result of the direction of rotation of hard disk 12), demand data 24 is read first. Prefetch data 25 is read on the assumption that the next data requested by host processor software will be the data that follows data 24.

Returning to FIG. 2, in response to the request received in 201, device driver 15 issuing read instructions (202) for demand data 24 and prefetch data 25 from hard disk 12. A program resident in a controller (not shown) on disk drive 14 provides the data to DMA engine 16 in response to the read instructions. DMA engine 16 then consults (203) a database, namely scatter/gather list 26, to determine where in memory 17 to store the data read in 202. Device driver 15 programs DMA engine 16 with scatter/gather list 26 prior to issuing the read instructions to hard disk 12. Scatter/gather list 26 includes entries which specify destination buffers (regions of memory 17) into which the demand data and the prefetch data are to be placed. The destination regions of memory may not be contiguous, in which case DMA engine 16 is programmed with multiple entries, one for each discontiguous region.

DMA engine 16 consults (203) scatter/gather list 26 periodically as blocks (associated with "LBAs", or "Logical Block Addresses") of data are read. The frequency at which scatter/gather list 26 is consulted may vary depending upon the size of the blocks of data.

Device driver 15 determines (204) the amount of data that has been read from hard disk 12 and satisfies a request based on the data. This may be done at any time during the reading process and it may be done in a number of ways. For example, DMA engine 16 may include a counter, which keeps track of the amount of data that has been read by counting the number of bytes transferred from hard disk 12 to host memory. Device driver 15 may monitor the current DMA transfer location via the counter to determine how much data has been stored in memory 17 since the start of the current reading operation and, thus, how much data has since been received from hard disk 12. Basically, device driver 15 checks DMA engine 16 to see how far along the DMA engine is in storing data from the current transfer operation.

Device driver 14 can determine (204) the amount of data that has been read before a request for demand and/or prefetch data has been fully satisfied. Device driver 14 can then use this information to satisfy requests for data immediately, without waiting for all of the data to be read in response to the original request. For example, assume that a prefetch request has been issued for 64 kilobytes (KB) of data and is currently being satisfied (i.e., data is being read in response to the prefetch request). While the prefetch request is being satisfied, a demand request for 4 KB of data is received. These 4 KB constitute data that is part of the prefetch request. If the 4 KB of data have already been retrieved in response to the prefetch request, then the 4 KB of data can be transferred to the requestor (e.g., a software program) immediately to satisfy the request for 4 KB of demand data. Thus, there is no need to wait for the prefetch request for 64 KB of data to be completed before transferring the 4 KB of demand data. If the 4 KB of data have not yet been retrieved in response to the prefetch request, the 4 KB are transferred immediately when they are retrieved. This feature increases the operational efficiency of disk drive 10, since it eliminates the need to wait for an entire prefetch request to be completed before satisfying a demand request.

Another advantage associated with knowing how much data has been transferred at any given time relates to storing prefetch data. For example, sequential prefetch data may be read in response to a first request for data, where "sequential prefetch data" refers to data that follows demand data in sequence (see data 25 of FIG. 3). If a second request is for non-sequential data, meaning data that does not follow the demand data in sequence, the prefetch request may be aborted and the prefetch data that has been read up to that point can be stored in memory 17. Since the amount of data that has been transferred is known, a record is maintained of the data that has been read and, thus, that data does not have to be re-read from hard disk 12 if it is needed. Heretofore, aborting a prefetch request in progress would result in such data typically being discarded, resulting in the need to re-read the data if that data was subsequently needed.

Accordingly, determining (204) may include the following. Device driver 15 determines (204a) if data that is currently being prefetched can be used to satisfy a demand request. In particular, device driver 15 consults DMA engine 16 to determine if the amount of data that has been read up to that point is sufficient to satisfy the demand request. If the amount of data is sufficient to satisfy the demand request, device driver 15 satisfies (204b) the request by transferring that data from a prefetch buffer portion of memory 17 to whatever computer program issued the original request. The data is transferred immediately without waiting for the prefetch request to be completed. If there is not sufficient data to satisfy the demand request, device driver 15 waits (204c) until sufficient data has been read and then satisfies (204c) the request as soon as that data has been read. Again, it is not necessary to wait until the entire prefetch request has been satisfied. Representative pseudo-code for implementing this process is shown in the attached Appendix.

Figure 4:
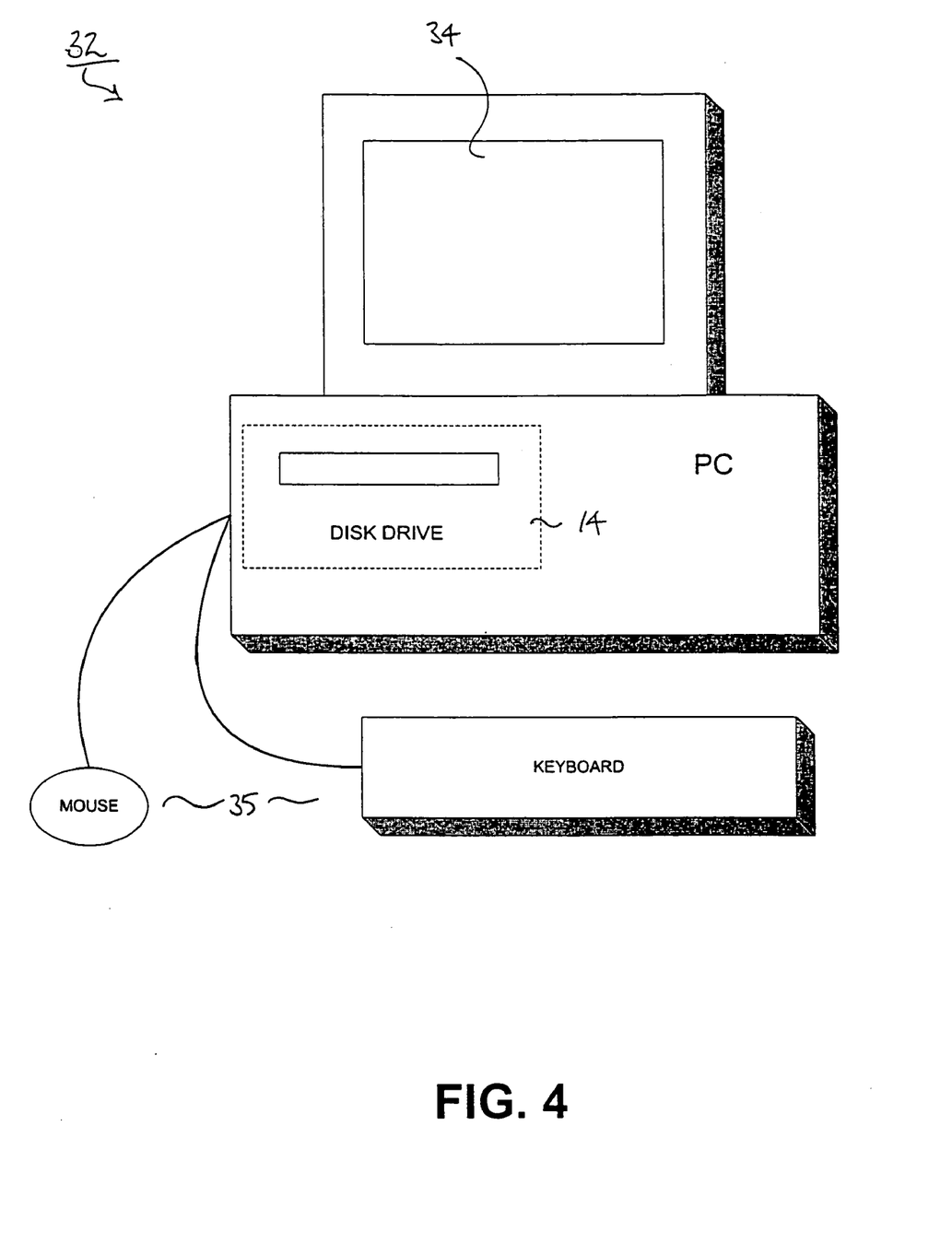
FIG. 4 is a front view of a computer which can function as the host processing device.

Hardware on which process 19 may be implemented is shown in FIG. 4. Personal computer ("PC") 32 includes disk drive 14 which reads and writes data on a hard disk, a display screen 34 which displays information, and input devices 35 which input data. A processor 36 (FIG. 5) in PC 32 runs device driver 15 and acts as the host processing device. DMA engine 16 uses scatter/gather list 26 (stored in memory 17).

Figure 5:
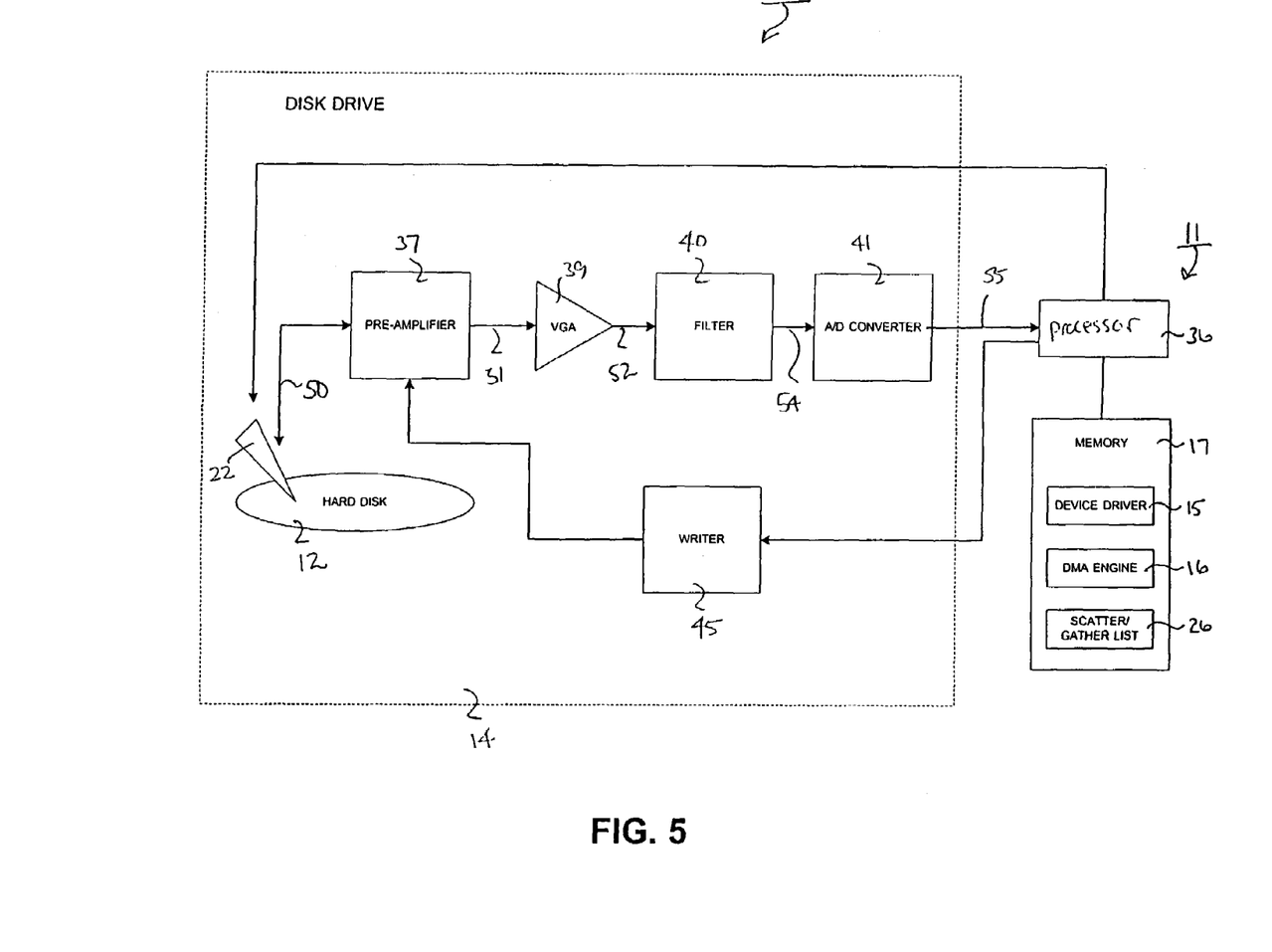
FIG. 5 is a block diagram of hardware included in the disk drive and the host processing device.

FIG. 5 also shows components of disk drive 14. Among these components are hard disk 12, transducer head 22, pre-amplifier 37, analog variable gain amplifier ("VGA") 39, filter 40, analog-to-digital ("A/D") converter 41, processor 36 (including memory 17), and writer 45.

Hard disk 12 is a magnetic disk having concentric data storage channels defined on each of its storage surfaces. Hard disk 12 is rotated inside disk drive 14 while data is read from/written to its channels. Although only one hard disk 12 is shown, more than one disk may be included in disk drive 14.

Transducer head 22 is a magneto-resistive head (or similar device) that is capable of reading data from, and writing data to, hard disk 12. Transducer head 22 is associated in a "flying" relationship over a storage surface of hard disk 12, meaning that it is movable relative to, and over, the storage surface in order to read and write data.

To read data from hard disk 12, device driver 15 (executing in processor 36) sends a signal to transducer head 22 to move transducer head 22 to locations on hard disk 12 from which data is to be read (process 19).

Transducer head 22 senses flux transitions as it moves in proximity to locations on hard disk 12. These flux transitions 50 are provided to pre-amplifier 37. Pre-amplifier 37 is a voltage pre-amplifier that amplifies the flux transitions from millivolts (mV) to volts (V). The resulting pre-amplified analog signal (or "read" signal) 51 is provided to VGA 39.

VGA 39 amplifies read signal 51 and provides a resulting amplified read signal 52 to filter 40.

Filter 40 is a filter/equalizer that generates a substantially square wave from amplified read signal 52. Resulting filtered signal 54 is subjected to sampling and quantization within high-speed A/D converter 41. A/D converter 41 outputs digital data 55 generated from signal 54. Data 55 corresponds to the data stored on hard disk 12.

Writer 45 is provided for writing data to hard disk 12 (via transducer head 22). Memory 17 stores computer instructions (including software for device driver 15) for implementing process 19. Memory 17 also stores scatter/gather list 26.

Process 19 is not limited to use with the foregoing hardware and software configurations; it may find applicability in any computing or processing environment. Process 19 may be implemented in hardware, software, or a combination of the two. Process 19 may be implemented in one or more computer programs executing on programmable computers that each include a processor, a storage medium readable by the processor (including volatile and non-volatile memory and/or storage elements), at least one input device, and one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., hard disk or magnetic diskette) that is readable by a general or special purpose programmable computer for configuring and operating the computer when the storage medium or device is read by the computer to perform process 19. Process 19 may also be implemented as a computer-readable storage medium, configured with a computer program, where, upon execution, instructions in the computer program cause the computer to operate in accordance with process 19.

Other embodiments not specifically described herein are also within the scope of the following claims. For example, process 19 can be used to access data stored on other storage media, including optical media, such as CDs ("Compact Disks"), DVDs ("Digital Video Disks"), and DLT ("Digital Linear Tape"). Device driver 15 may be an ATA ("Advanced Technology Attachment") driver. Process 19 may be executed in a different order from that shown and/or one or more blocks thereof may be executed concurrently. Additionally, while the invention has been described in the context of reading data from a storage medium, it can also be used in writing data to a storage medium.

APPENDIX

Procedure PerformDiskRequest(DiskBlockNumber, Transfer Length)

```
{
    If (DiskisBusyWithPrefetch( ) && PrefetchLocation==
    DiskBlockNumber)
    {
        If (DMAProgress>=TransferLength)
            //This is the optimized early demand completion
            SatisfyRequestFromPrefetchBuffer( );
            Return;
    }
```

-continued

```
        else
        {
            WaitForPrefetchToComplete( );
                //Alternatively, this could be: while
                // (DMAProgress<TransferLength)
            SatisfyRequestFromPrefetchBuffer( );
            Return;
        }
    }
    else
    {
        WaitforDiskIdle( );
        GetDemandDatafromDisk(DiskBlockNumber, TransferLength);
        StartPrefetchAtLocation(DiskBlockNumber + TransferLength);
    }
}
```

What is claimed is:

1. A system comprising:
a storage medium;
a transducer to read data from the storage medium; and
a processing device to execute a driver to control motion of the transducer relative to the storage medium, wherein the processing device is configured to execute the driver to:
  initiate reading of prefetch data from the storage medium in response to a request for data;
  before completing reading the prefetch data, receive a request for demand data; and
  satisfy the request for demand data by providing at least a portion of the prefetch data prior to completing reading all of the prefetch data.

2. The system of claim 1, wherein the processing device is configured to execute the driver to determine an amount of prefetch data that has been read prior to completing reading all of the prefetch data; and
wherein determining comprises keeping track of the prefetch data as the prefetch data is read.

3. The system of claim 1, wherein the transducer comprises a magneto-resistive head that is capable of reading data from, and of writing data to, the storage medium.

4. The system of claim 1, wherein the demand data comprises data for a computer program and the prefetch data comprises data adjacent to the demand data.

5. The system of claim 1, wherein the request for demand data is satisfied without substantial delay using the prefetch data.

6. The system of claim 1, wherein, if an amount of prefetch data that has been read is not sufficient to satisfy the request for demand data, the processing device is configured to execute the driver to wait for an amount of prefetch data to be read that is sufficient to satisfy the request for demand data.

7. The system of claim 1, wherein the processing device is configured to execute the driver to:
  receive a second request for data, where prefetch data associated with the second request is out of sequence relative to prefetch data associated with prefetch data that was read in response to a first request; and
  store an amount of prefetch data that has been read in response to the first request up to a point at which the second request is received.

8. The system of claim 1, wherein the storage medium comprises a hard disk having concentric data storage channels defined on one or more storage surfaces.

9. The system at claim 1, wherein the transducer is associated in a flying relationship over the storage medium.

10. The system of claim 9, wherein the transducer is configured to read the data by sensing flux transitions in the storage medium as the transducer moves relative to the storage medium; and
wherein the system further comprises:
  a pre-amplifier to amplify the flux transitions;
  a variable gain amplifier to amplify an output of the pre-amplifier;
  a filter to generate a square wave from an output of the variable gain amplifier; and
  an analog-to digital converter to generate a digital signal from the square wave, the analog-to-digital converter providing the digital signal to the processing device, the digital signal corresponding to at least one of the demand data and the prefetch data.

11. The system of claim 1, further comprising:
a writer to provide data to the pre-amplifier, the data to be written to the storage medium via the transducer.

12. The system of claim 1, wherein the processing device is configured to receive a request from a computer program, the request from the computer program instructing the driver to read data from a location on the storage medium.

13. The system of claim 1, wherein the processing device is configured to execute a direct memory access engine, the data read from the storage medium being transferred to the direct memory access engine, the direct memory access engine for consulting a table to determine where to store the data.

14. The system of claim 13, wherein the table comprises a scatter/gather list.

15. A disk drive comprising:
a transducer head to sense flux transitions in a hard disk;
an analog-to digital converter to generate data that corresponds to the flux transitions in the hard disk; and
a processing device to execute a driver to control the transducer head, wherein the processing device is configured to execute the driver to:
  read data in response to a request for a first predetermined amount of data;
  determine an amount of data that has been read prior to completing reading the first predetermined amount of data;
  receive a second request for a second predetermined amount of data, the second predetermined amount of data being out of sequence relative to the first predetermined amount of data; and
  store an amount of data that has been read up to a point at which the second request is received.

16. The system of claim 15, wherein the first and second predetermined amounts of data comprise different sets of prefetch data and demand data, the demand data comprising data for a computer program and the prefetch data comprising data adjacent to the demand data.

17. The system of claim 15, wherein the second request is for demand data; and
the processing device is configured to execute the driver to:
  read prefetch data in response to the second request; and
  satisfy the second request with prefetch data prior to completing reading all of the prefetch data in response to the second request.

18. A disk drive comprising:
a transducer head to sense flux transitions in a hard disk;
an analog-to digital converter to generate data that corresponds to the flux transitions in the hard disk; and
a processing device to execute a driver to control the transducer head, wherein the processing device is configured to execute the driver to:

read data in response to a request for a predetermined amount of data, the predetermined amount of data comprising prefetch data and demand data, the demand data comprising data for a computer program and the prefetch data comprising data adjacent to the demand data;

determine an amount of data that has been read prior to completing reading the predetermined amount of data;

satisfy a request for the demand data based on the amount of data that has been read prior to completing reading the predetermined amount of data; and wait for an amount of data to be read that is sufficient to satisfy the request for the demand data if the amount of data that has been read is not sufficient to satisfy the request the demand data.

19. The disk drive of claim 18, wherein determining comprises keeping track of the data as the data is read.

20. The disk drive of claim 19, wherein determining comprises maintaining a count of data that has been read.

* * * * *

UNITED STATES PATENT AND TRADEMARK OFFICE
CERTIFICATE OF CORRECTION

PATENT NO. : 7,330,939 B2  Page 1 of 1
APPLICATION NO. : 11/039277
DATED : February 12, 2008
INVENTOR(S) : Knut S. Grimsrud and Amber D. Huffman It is certified that error appears in the above-identified patent and that said Letters Patent is hereby corrected as shown below:

On the Title page insert:

-- RELATED U.S. APPLICATION DATA

[62] Continuation of application No. 09/541,115, filed on March 31, 2000, now Patent No. 6,934,807. --

Signed and Sealed this

Seventeenth Day of June, 2008

JON W. DUDAS
*Director of the United States Patent and Trademark Office*